April 7, 1970     D. S. TEPERSON     3,504,378
METHOD OF PRODUCING COMPOSITE STIFFENING MEMBERS FOR COLLARS
Filed Jan. 17, 1967     2 Sheets-Sheet 1

Inventor
DAVID SAMUEL TEPERSON

By Jacobi & Davidson
Attorneys

April 7, 1970    D. S. TEPERSON    3,504,378
METHOD OF PRODUCING COMPOSITE STIFFENING MEMBERS FOR COLLARS
Filed Jan. 17, 1967    2 Sheets-Sheet 2

Inventor
DAVID SAMUEL TEPERSON

By Jacobi & Davidson
Attorneys

United States Patent Office 3,504,378
Patented Apr. 7, 1970

3,504,378
METHOD OF PRODUCING COMPOSITE STIFFENING MEMBERS FOR COLLARS
David S. Teperson, Johannesburg, Transvaal, Republic of South Africa, assignor to Dubin-Haskell-Jacobson (S.A.) (Proprietary) Limited, Johannesburg, Transvaal, Republic of South Africa, a corporation of Republic of South Africa
Filed Jan. 17, 1967, Ser. No. 609,871
Claims priority, application Republic of South Africa, Feb. 8, 1966, 66/741
Int. Cl. A41b 3/06
U.S. Cl. 2—143
6 Claims

ABSTRACT OF THE DISCLOSURE

Manufacture of composite collar stiffeners which includes the preassembly of component parts to form a workpiece from which stiffeners are then cut by feeding the workpiece automatically into reciprocating blanking-out dies.

BACKGROUND OF THE INVENTION

This invention relates to the manufacture of clothing which requires stiffening, for example, the wing ends of shirt collars. It relates in particular to the manufacture of composite stiffening members having a plurality of constituent parts.

According to earlier practice known to the applicant, constituent parts of composite stiffening members were first cut to size and then assembled to form composite stiffening members.

SUMMARY OF THE INVENTION

In accordance with the applicants' invention, a method of producing composite stiffening members such as for collars in the manufacture of clothing, includes the steps of preassembling component parts to form a workpiece and of then blanking composite stiffening members out of the workpiece by feeding the workpiece automatically into reciprocating blanking-out dies.

Further according to the invention, a method of producing stiffening members such as for collars, in the manufacture of clothing, includes the steps of providing a workpiece by securing a stiffening element strip to backing material and of then blanking out stiffening members from the workpiece by means of automatically fed cutting dies such that each stiffening member includes a part of the backing material and a part of the stiffening element strip.

The backing material may be of strip form, the stiffening element strip extending along its length. The blanking out of the stiffening members may be by blanking out waste material from the workpiece in successive blanking-out operations.

The method may include the further step of varying the rate of feeding of the workpiece between successive blanking-out operations in order to produce stiffening members of different lengths. The method may include the yet further step of feeding the workpiece past the blanking-out dies along a predetermined line, and of varying the disposition of the edges of the workpiece relative to that line in order to obtain different end shapes of stiffening members.

The backing material may have a pressure- or heat and pressure-sensitive adhesive coating on at least one of its surfaces. The manner of securing the stiffening element strip to the backing material, may be by stitching. The strip of backing material may be of uniform width and the stiffening element strip may be disposed closer to one edge of the backing material strip than to its other edge.

If desired, a plurality of stiffening element strips may be secured in parallel spaced relationship to the strip of backing material.

The invention will now be described by way of example with reference to the accompanying drawings, in which particular embodiments of the invention are illustrated.

Figure 1:
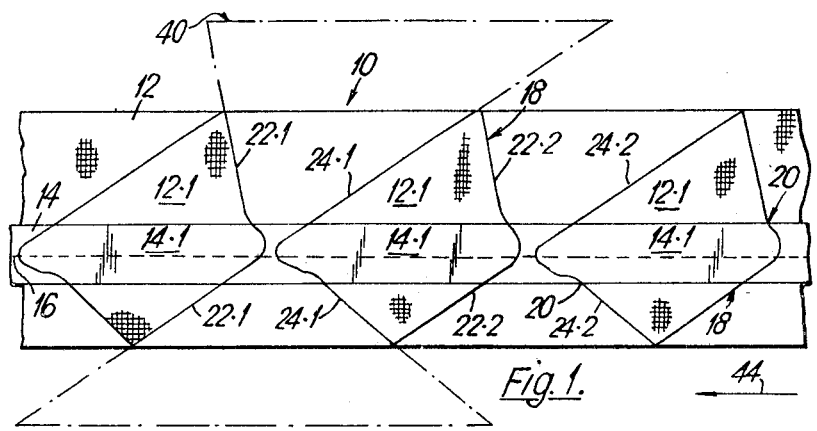
FIGURE 1 shows a plan view of a workpiece and collar stiffening members in relation thereto.
Figure 2:
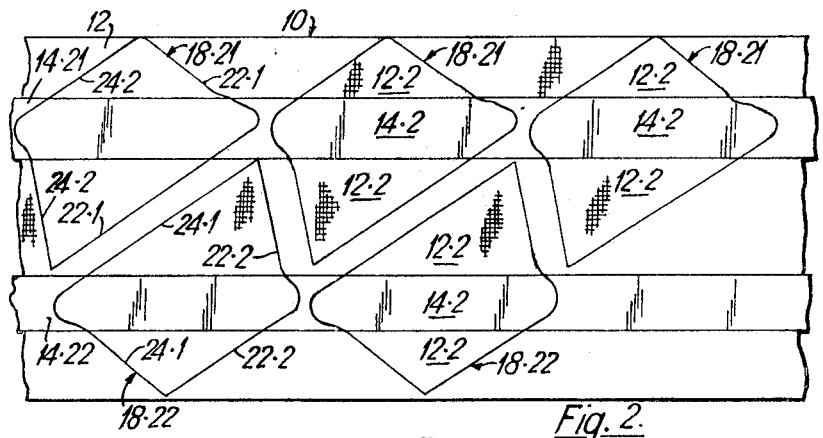
FIGURE 2 shows a plan view of another type of workpiece, and collar stiffening members in relation thereto.

Referring to the drawings, reference numeral 10 refers generally to a workpiece having as component parts a strip of woven backing material 12, and a stiffening element strip material 14 of synthetic plastic material secured thereto. The stiffening element strip 14 may be secured to the strip of backing material 12 by means of a line of stitching 16, as shown in FIGURE 1, or by means of adhesive as shown in FIGURE 2. Reference numeral 18 refers generally to stiffening members or panels of generally trapezoidal form, having as constituent parts the stiffening element part 14.1 and the backing material part 12.1 formed from the workpiece component parts 14 and 12 respectively.

FIGURE 1 of the drawings shows the shape of the panels 18, which are cut as the workpiece 10 is fed into a blanking machine. The edges 20 are rounded to avoid sharp corners in the stiffening element strip. The blanking lines 22.1 and 24.1 are blanked simultaneously in one blanking stroke of the machine, and the blanking lines 22.2 and 24.2 are blanked simultaneously in the succeeding stroke of the machine when the workpiece is fed in the direction of arrow 44. It will be noticed therefore that the blanking-out operation for blanking out the leading and trailing edges of adjacent stiffening members 18, may be carried out by a die of substantially hourglas shape. A shape of die which may be suitable is shown by reference numeral 40. It will be noted that it extends laterally beyond the edges of the workpiece 10. This permits the use of different widths of workpieces transversely to the direction of feeding. Waste material is blanked out between adjacent stiffening members and is defined by the lines 22.1 and 24.1 for a first blanking operation, and by lines 22.2 and 24.2 for a succeeding blanking operation.

In FIGURE 2 of the drawings it is shown how two laterally spaced panels 18.21 and 18.22 may be simultaneously cut from the strip material 10 in the case where two spaced stiffening element strips 14.21 and 14.22 are provided. They are shown secured to the strip of backing material 12 by means of adhesive, but stitching would also have been suitable. The stiffening members or panels 18.21 and 18.22 are cut such that wastage of material is reduced to a minimum. Here the stiffening members 18.21 and 18.22 are themselves blanked out, and they are not formed by the blanking out of waste material between them. The stiffening members 18.21 and 18.22 have as their constituent parts the stiffening element parts 14.2 and backing material parts 12.2 formed from the workpiece component parts 14 and 12 respectively.

The ends of the blanking lines 24.1 and 22.2 of the stiffening element 18.22 of FIGURE 2 are shown just clear of the edges of the stiffening element strip 14.21. Similarly, the ends of the blanking lines 22.1 and 24.2 just clear the edges of the stiffening element strip 14.22. If the stiffening element strips 14.21 and 14.22 had been stitched to the strip of backing material 12 by a central stitch-line 16 as shown in FIGURE 1, it would have been sufficient to have the ends of the lines abovementioned, clear such stitching 16. This can result in further economy in material.

Figure 3:
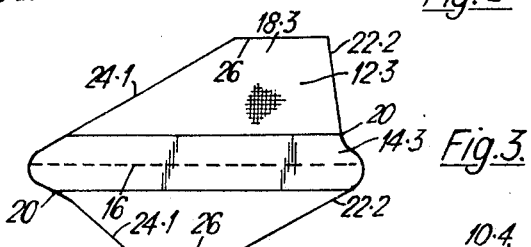
FIGURE 3 shows a plan view of a collar stiffening member having end formations similar to those shown in FIGURES 1 and 2, but of increased length.

In FIGURE 3 of the drawings there is shown a stiffening member or panel 18.3 comprised of constituent parts 12.3 and 14.3 and which is of increased length when compared with the panels 18 and 18.21 and 18.22 shown in FIGURES 1 and 2 of the drawings. The increase in length is obtained by increasing the feed rate of the workpiece 10, per stroke of the blanking machine. This results in the ends of blanking lines 22.2 being joined to blanking lines 24.1 by parallel lines 26, thereby providing increased length, instead of the said lines intersecting, as shown in FIGURES 1 and 2 of the drawings. The parallel lines 26 define the width of the strip of backing material and hence also of the workpiece.

Figure 4:
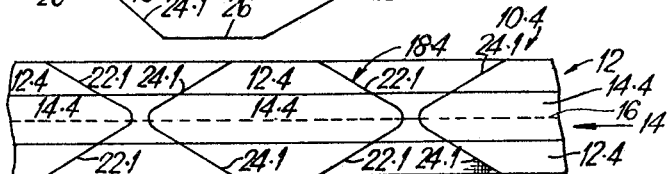
FIGURE 4 shows a plan view of a workpiece for another shape of collar stiffening member.

Referring now to FIGURE 4 of the drawings, there is shown a workpiece 10.4 having a strip of backing material 12 which has a stiffening element strip 14 secured longitudinally symmetrically to it by stitching 16. The stiffening members 18.4 formed from this workpiece, are conveniently of substantially parallelogram shape and have constituent parts 12.4 and 14.4. In other respects, the workpiece 10.4 is similar to that of FIGURES 1 and 2, and the method of blanking out is the same. The length of the stiffening member 18.4 may be increased in the same fashion as that of the stiffening members shown in FIGURES 1 and 2 to have an increased length, for example, as shown in FIGURE 3. In this case also, a die for blanking out waste material between adjacent stiffening members 18.4, may be substantially of hour-glass shape. A blanking die of this type will have cutting faces 22.1 and 24.1.

Figure 5:
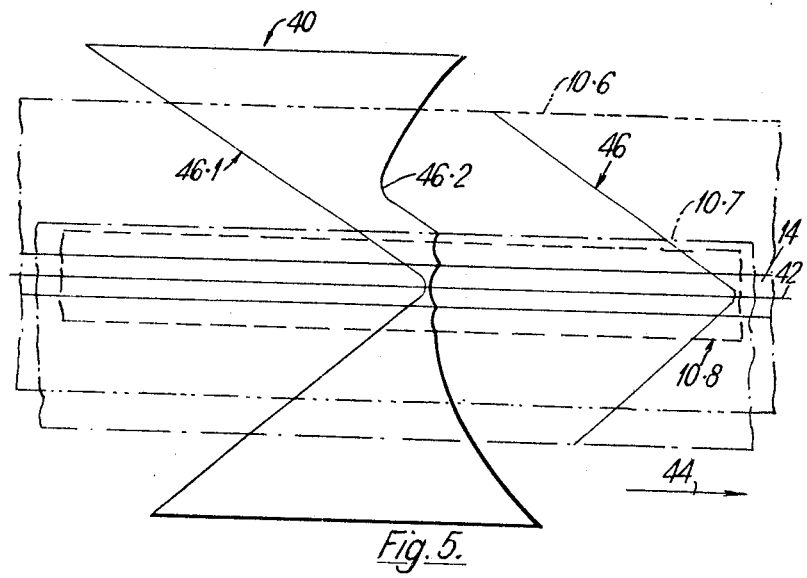
FIGURE 5 shows a plan view of die profile relative to different shapes and sizes of workpieces for producing different shapes and sizes of collar stiffening members.

Referring now to FIGURE 5 of the drawings, reference numeral 40 shows the outer cutting profile of a male die. Reference numerals 10.6, 10.7 and 10.8 relate to different widths of workpieces fed in the direction of arrow 44 along a determined line 42, which may be the centre line of the stiffening element strip 14, attached to the workpieces 10.6, 10.7 or 10.8.

In order to save space in the drawings, the workpieces 10.6, 10.7 and 10.8 are shown overlapping each other. In practice they will not be fed between the blanking-out dies simultaneously. The line 46 indicates the cutting line of a preceding blanking-out operation, whereas the line 46.1 indicates the corresponding cutting line of a succeeding blanking-out operation. Line 46.2 corresponds to the other cutting edge of the die, and is cut simultaneously with the line 46.1.

Figure 7:
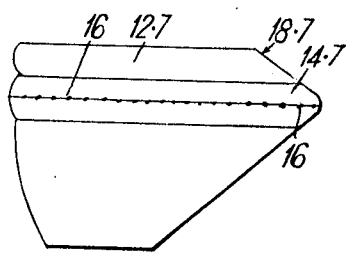
FIGURES 6, 7 and 8 show different shapes and sizes of collar stiffening members obtainable from the die shape of FIGURE 5, by varying the shape and size of workpiece.
Figure 6:
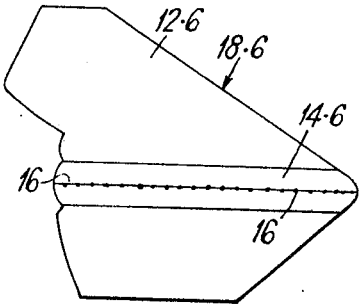
Figure 8:
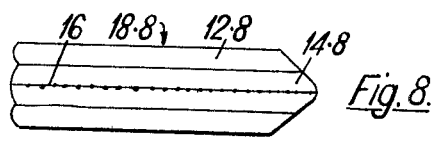

Depending upon the disposition of the stiffening element relative to the edges of the workpieces, different shapes of stiffening members 18.6, 18.7, and 18.8 may be obtained, as shown in FIGURES 6, 7 and 8 of the drawings. These stiffening members will have as their constituent parts the parts 12.6 and 14.6, 12.7 and 14.7, and 12.8 and 14.8 respectively.

The stiffening member 18.6 is produced from a workpiece 10.6, when its stitch-line 16 is fed along the feed-line 42. Similarly, the stiffening member 18.7 is produced from a workpiece 10.7 when its stitch-line 16 is fed along feed-line 42. So also is the strip member 18.8 produced from a workpiece 10.8 when fed along in direction 44 with its stitch-line 16 extending along feed-line 42.

It is therefore clear that the instant invention provides an economically feasible method of producing collars in clothing manufacture. Particularly, this invention provides a method of producing composite stiffening members for laminar association with and stiffening of the wing ends of collars. The method includes the steps of providing a laminar strip workpiece of a stiffening element strip superimposed upon a textile backing strip having a transverse dimension substantially in excess of the transverse dimension of the stiffening element strip. The laminar strip workpiece is fed longitudinally beneath and past a cutting station having a reciprocating cutting means, preferably a profiled die means. The cutting step including cutting the laminar strip workpieces into successive laminar composite stiffening members by severing the laminar strip workpiece along plural transverse lines of cut extending at least generally transversely of the line of feed and including at least two cooperating lines of cut defining and individual composite stiffennig member with at least one of the two lines of cut defining a corner with the stiffening element of said individual composite stiffening member extending away from such corner. Further, the length of such said cooperating transverse line of cut is substantially longer than the width of the stiffening element strip so as to provide a substantial surface and of textile backing material sufficient to facilitate assembly of an individual composite stiffening member with the fabric of the wing end of a collar.

Apart from savings in production costs afforded by this method, it is a further advantage, as will have been noted from the above description, how easily the shape and dimensions of the stiffening members may be changed to suit different requirements.

What is claimed is:

1. In the production of collars in clothing manufacture, the method of producing composite stiffening members for laminar association with and stiffening of the wing ends of collars including the steps of providing a laminar strip workpiece of a stiffening element strip superimposed upon a extile backing material strip having a transverse dimension substantially in excess of the transverse dimension of said stiffening element strip, feeding said laminar strip workpiece longitudinally, cutting said laminar strip workpiece into successive individual laminar composite stiffening members by severing the said laminar strip workpiece along plural transverse lines of cut extending at least generally transversely of the line of feed and including at least two cooperating lines of cut defining an individual composite stiffening member with at least one of said two lines of cut defining a corner with the stiffening element of said individual composite stiffening member extending away from such corner and the length of said cooperating transverse lines of cut being substantially longer than the width of said stiffening element strip so as to provide a substantial surface area of textile backing material sufficient to facilitate assembly of an individual composite stiffening member with the fabric of the wing end of a collar.

2. The method as claimed in claim 1 and superimposing said stiffening element strip upon said textile backing strip having a transverse dimension substantially in excess of the transverse dimension of said stiffening element strip and securing said superimposing strips together longitudinally along a single line.

3. The method as claimed in claim 1 and said cutting step comprising blanking out waste material from said laminar strip workpiece in successive blanking out operations.

4. The method as claimed in claim 3 and further including the step of varying the rate of feed of said laminar strip workpiece between successive blanking out operations to obtain composite stiffening members of different length.

5. The method as claimed in claim 1 and said stiffening element strip being closer to one edge of said textile backing strip than the other.

6. The method as claimed in claim 5 and said cutting step comprising reciprocating movements along a fixed line of movement and perpendicular to the direction of feed of said laminar strip workpiece and varying the line of feed of the edges of said laminar strip workpiece transversely of said fixed line of movement to obtain varying shapes of composite stiffening members.

References Cited

UNITED STATES PATENTS

| | | | |
|---|---|---|---|
| 3,132,347 | 5/1964 | Light | 2—132 |
| 351,344 | 10/1886 | Stone et al. | 2—258 |
| 2,769,979 | 11/1956 | Driesbach | 2—132 |
| 2,857,967 | 10/1958 | Liebowitz. | |
| 2,928,089 | 3/1960 | Bihaly | 2—143 XR |
| 3,030,633 | 4/1962 | Chalfin | 2—258 |
| 3,113,741 | 12/1963 | Herr | 83—55 XR |

FOREIGN PATENTS

| | | |
|---|---|---|
| 596,870 | 8/1959 | Italy. |
| 833,882 | 5/1960 | Great Britain. |
| 889,348 | 2/1962 | Great Britain. |

JAMES R. BOLER, Primary Examiner

U.S. Cl. X.R.

2—132